United States Patent
Lee et al.

(10) Patent No.: US 7,076,122 B2
(45) Date of Patent: Jul. 11, 2006

(54) PATCH-TYPE EXTRINSIC FABRY-PEROT INTERFEROMETRIC FIBER OPTIC SENSOR AND REAL-TIME STRUCTURAL VIBRATION MONITORING METHOD USING THE SAME

(75) Inventors: In Lee, Daejeon (KR); Jae Hung Han, Daejeon (KR); Do Hyung Kim, Daejeon (KR); Young Hwan Chang, Seoul (KR)

(73) Assignee: Korean Advanced Institute of Science and Technology, Daejeon-Si (KR)

( * ) Notice: Subject to any disclaimer, the term of this patent is extended or adjusted under 35 U.S.C. 154(b) by 156 days.

(21) Appl. No.: 10/892,977

(22) Filed: Jul. 15, 2004

(65) Prior Publication Data

US 2005/0013526 A1   Jan. 20, 2005

(30) Foreign Application Priority Data

Jul. 16, 2003 (KR) .................... 10-2003-0048637
Oct. 31, 2003 (KR) .................... 10-2003-0077052

(51) Int. Cl.
*G02B 6/00* (2006.01)
*G01J 4/00* (2006.01)
*G01B 9/02* (2006.01)

(52) U.S. Cl. ................. 385/12; 385/31; 385/53; 385/68; 385/88; 250/227.17; 250/227.18; 350/450; 350/454

(58) Field of Classification Search ............... 385/12, 385/31, 53, 66, 68, 88; 250/227.17, 227.18; 356/450, 454

See application file for complete search history.

(56) References Cited

U.S. PATENT DOCUMENTS

| 4,873,989 A | * | 10/1989 | Einzig ..................... 600/505 |
| 5,200,795 A | | 4/1993 | Kim et al. ............. 250/227.27 |
| 5,359,405 A | * | 10/1994 | Andrews .................... 356/35.5 |
| 5,898,517 A | | 4/1999 | Weis ........................ 356/5.89 |
| 6,191,414 B1 | * | 2/2001 | Ogle et al. ............. 250/227.14 |
| 6,327,036 B1 | | 12/2001 | Bao et al. .................... 356/480 |
| 6,513,390 B1 | * | 2/2003 | De La Puente et al. ...... 73/800 |
| 6,640,647 B1 | * | 11/2003 | Hong et al. ................... 73/800 |
| 6,891,621 B1 | * | 5/2005 | Berg et al. ................... 356/477 |

* cited by examiner

*Primary Examiner*—Brian Healy
(74) *Attorney, Agent, or Firm*—Thomas R. FitzGerald, Esq.; Hiscock & Barclay, LLP (57) ABSTRACT

A patch-type extrinsic Fabry-Perot interferometric fiber optic sensor and a real-time structural vibration monitoring method using the same are disclosed. The patch-type extrinsic Fabry-Perot interferometric fiber optic sensor is provided by combining the existing EFPI (Extrinsic Fabry-Perot Interferometer) fiber optic sensor with a direction-detecting sensor which can acquire direction information of a strain of a structure, which can solve a signal distortion problem occurring in the existing EFPI fiber optic sensor through a simple signal process. The patch-type extrinsic Fabry-Perot interferometric fiber optic sensor includes a piezoelectric material which can apply a control force to the existing EFPI fiber optic sensor, and a self-sensing bridge circuit for extracting the direction information when the piezoelectric material is used as an actuator, so that the sensible range of strain can be extended and the piezoelectric material can directly be used as the actuator based on the sensed signal.

9 Claims, 10 Drawing Sheets

PRIOR ART

FIG.10
PRIOR ART

PATCH-TYPE EXTRINSIC FABRY-PEROT INTERFEROMETRIC FIBER OPTIC SENSOR AND REAL-TIME STRUCTURAL VIBRATION MONITORING METHOD USING THE SAME

CROSS-REFERENCE TO RELATED APPLICATIONS

This application is based on Korean Patent Application Serial Number 10-2003-0048637 filed Jul. 16, 2003 and Korean Patent Application Serial Number 10-2003-0077052 filed Oct. 31, 2003.

BACKGROUND OF THE INVENTION

1. Field of the Invention

The present invention relates to a fiber optic sensor for sensing vibration of a structure, and more particularly, to a patch-type extrinsic Fabry-Perot interferometric fiber optic sensor in which the existing EFPI (Extrinsic Fabry-Perot Interferometer) fiber optic sensor and a direction-detecting sensor, which is usable as an actuator as well as senses strain of the structure, are combined, and a real-time structural vibration monitoring method using the fiber optic sensor.

2. Background of the Related Art

Recently, many researches have been made for a smart structure which can prevent damage of the structure by sensing and suppressing vibration of the structure and thus reduce the cost of maintenance and repair of the structure.

Such a smart structure includes a sensor system for sensing the variation of an external environment, a brain system for processing sensed information, and an actuator system for actively copying with the sensed variation of the external environment. The brain system comprises a microprocessor which performs a signal process and has a built-in database for characteristics of the structure. In the actuator system, piezoelectric ceramics, ER (Electro-Rheological) fluid or MR (Magneto-Rheological) fluid, which is controllable fluid, and functional materials such as shape memory alloys, may be used.

In the sensor system, semiconductor sensors, metal film sensors, piezoelectric sensors, fiber optic sensors, etc., may be used. In the case of constructing the sensor system using the fiber optic sensors, the sensor system is not affected by electromagnetic waves, and has a very wide operating temperature range. Also, since the optical fiber has a very fine diameter and is flexible, a user can easily construct a sensor of a desired size. Also, the optical fiber can provide a high resolution.

The fiber optic sensor implements a method using transfer/non-transfer of light according to a wave end of an optical fiber, a method using polarization of light, and a method using a light interference such as Mach-Zehnder, Michelson or Fabry-Perot interferometric fiber optic sensor, etc. Among them, the fiber optic sensor implementing the method using the light interference (i.e., interference type fiber optic sensor) measures a ratio of strain of a structure from an interference signal due to a difference of light paths.

Figure 9:
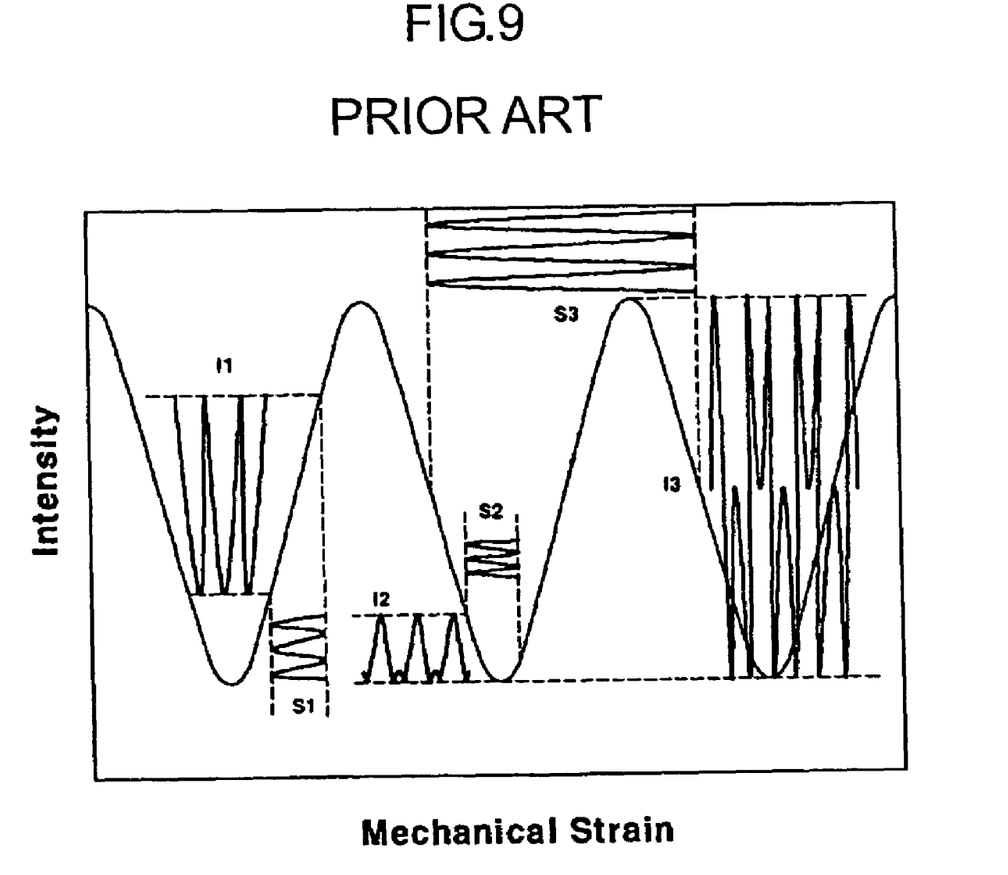
FIG. 9 is a graph showing a distortion phenomenon of the existing extrinsic Febry-Perot interferometric fiber optic signal.

However, although the interference type fiber optic sensor, as shown in FIG. 9, can accurately sense the ratio of strain of the structure when the light intensity is in a linear section, it presents a distorted signal with respect to the strain which is out of the linear section having a small width.

As shown in the drawing, relatively good intensity output signal, I1 can be extracted in linear section, S1, while distorted signal, I2 can be produced in a non-linear section, S2, which has different initial optical phase. And the distortion of output signal becomes severe when the amplitude of dynamic strain is excessively large; which is described as I3 and S3 in FIG. 9.

Also, a structural vibration of the structure may cause signal distortion, and this causes the use of the interference type fiber optic sensor as a vibration sensor to be restrictive.

In order to solve this, a cantilever extrinsic Fabry-Perot interferometer sensor and a quadrature phase shifted fiber optic sensor have been developed. However, it is difficult for these fiber optic sensors to perform a real-time signal process and to measure the range of strain.

Meanwhile, many researches have also been made for a smart sensor technology in which one sensor or actuator performs both functions of the sensor and the actuator, instead of the smart structure composed of three parts, i.e., sensor system, brain system and actuator system.

This type of a sensoriactuator can heighten the stability in control, the structural stability when it is inserted into or attached to the structure, and the spatial efficiency. Also, it is very economical since the sensor and the actuator can be replaced by one sensoriactuator. In the early stage, only researches for a simple combination of the sensor and the actuator were made, and in the 1990's, many types of sensoriactuators using piezoelectric materials were developed.

However, the performance of the sensoriactuator as a sensor or an actuator deteriorated due to the non-linear behavior or hysteresis behavior of the piezoelectric material, the uppermost limit of a high voltage caused by the use of a compensation circuit, etc., and this caused the continuous related researches not to be made.

Figure 10:
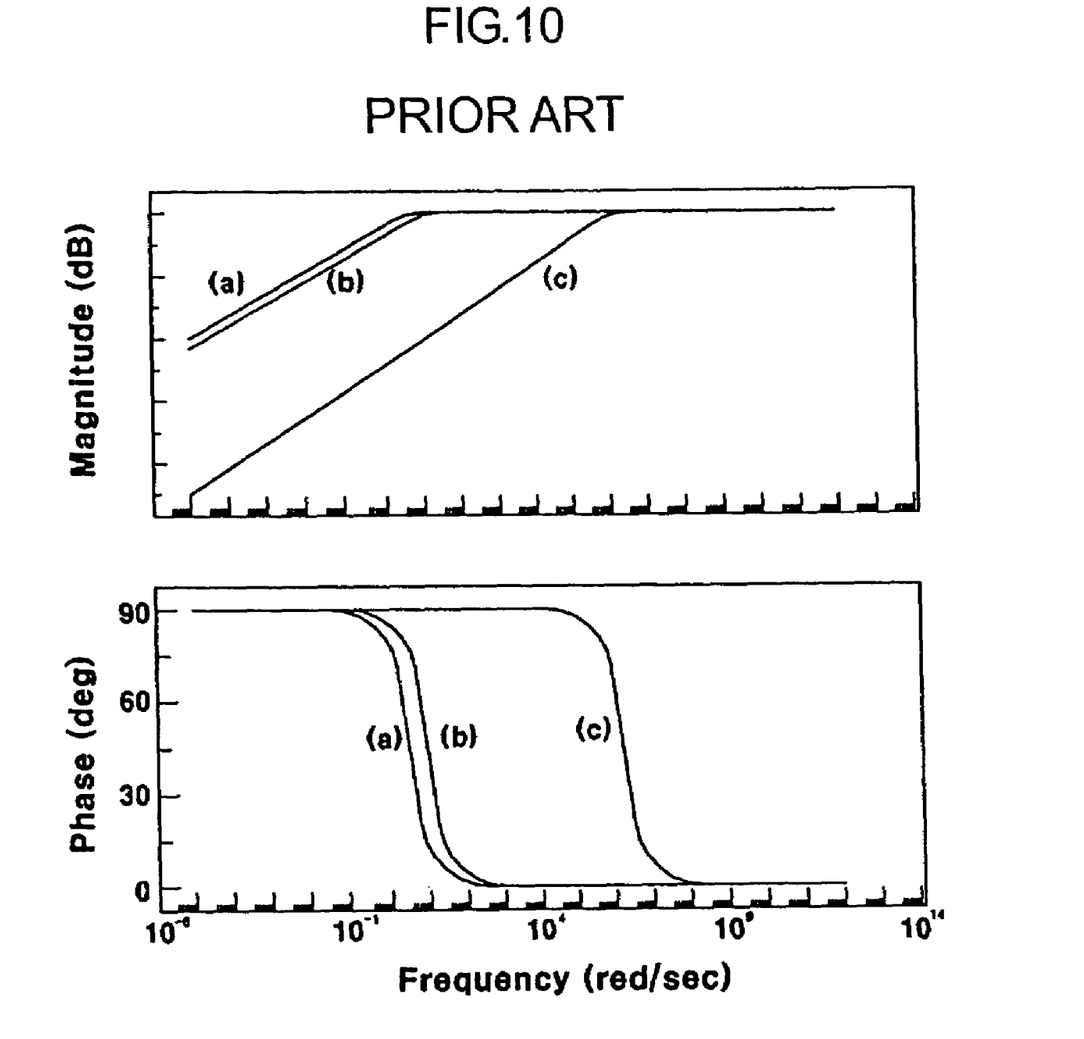
FIG. 10 is a graph showing the frequency characteristics of a conventional self-sensing bridge circuit.

FIG. 10 illustrates the frequency characteristics of a sensoriactuator using the existing piezoelectric material and a self-sensing bridge circuit only, in which (a), (b) and (c) show the results of measurement with resistance ratios used in the circuit varied.

As shown in the drawing, although the phase difference of the frequencies should be kept constant in order that the actuator is used as the sensor, the magnitude actually increases even in the case that the phase is kept constant, and this causes only the frequency component of a specified mode of the structure to be emphasized to limit the range of a usable frequency band.

SUMMARY OF THE INVENTION

Accordingly, the presenting invention has been made to resolve the above problems occurring in the prior art, and an object of the present invention is to provide a patch-type extrinsic Fabry-Perot interferometric fiber optic sensor which can solve a signal distortion problem occurring in the existing extrinsic Febry-Perot interferometric fiber optic sensor by using a high-precision extrinsic Febry-Perot fiber optic sensor as a main sensor and a piezoelectric material as an actuator, and simultaneously by extracting directional information, and thus which can be adopted in sensing structural vibration and strain of the structure.

In an aspect of the present invention, there is provided a patch-type extrinsic Fabry-Perot interferometric fiber optic sensor, comprising first and second single-mode optical fibers, inserted into both sides of a capillary quartz glass tube and fixed to both end parts of the capillary quartz glass tube for forming an air gap between the first and second single-mode optical fibers; a piezoelectric material used as an actuator fixed to an outer periphery of the capillary quartz glass tube; and a self-sensing bridge circuit for extracting only signals caused by a mechanical strain from the piezoelectric material.

Here, the self-sensing bridge circuit forms a closed circuit network in which a piezoelectric material unit composed of $V_P$ and $C_P$, a condenser $C_m$ having the same capacitance as the piezoelectric material unit and general high-capacity resistors $R_0$ are connected in order, wherein a voltage $V_c$ for a control signal is applied between a connection point of the piezoelectric material unit and the condenser and a connection point of the resistors, and a voltage measuring unit $V_s$ are connected between a connection point ($V_1$ point) of the piezoelectric material unit and one of the resistors and a connection point ($V_2$ point) of the condenser and the other of the resistors to extract an electric potential difference between the connection points ($V_1$ and $V_2$ points).

Also, a real-time structural vibration monitoring method according to the present invention is achieved through a phase accumulation technique based on direction information extracted through the piezoelectric material and the self-sensing bridge circuit and an optical signal from the extrinsic Fabry-Perot interferometric fiber optic sensor. In still another aspect of the present invention, there is provided a real-time structural vibration monitoring method using a patch-type extrinsic Fabry-Perot interferometric fiber optic sensor, comprising the steps of (a) acquiring an optical intensity and direction information using the patch-type extrinsic Fabry-Perot interferometric fiber optic sensor; (b) obtaining a phase increment using the optical intensity; (c) obtaining a compensated phase increment using the direction information; (d) performing a phase accumulation by repeating the step (c) for a predetermined number of times; and (e) obtaining an amount of strain of a structure using the phase accumulation at the step (d).

According to the present invention, the strain of the structure is sensed simultaneously with a real-time applying of a control force to the structure, and thus the stability of a 'direct-feedback control loop' can be heightened. Also, since the actuator/sensor can be inserted in the unit of a module, the durable stability can be heightened and the overall construction of the system can be simplified in the case that the present invention is applied to a large-sized structure or an MEMS system.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiment of the present invention, examples of which are illustrated in the accompanying drawings.

Figure 1:
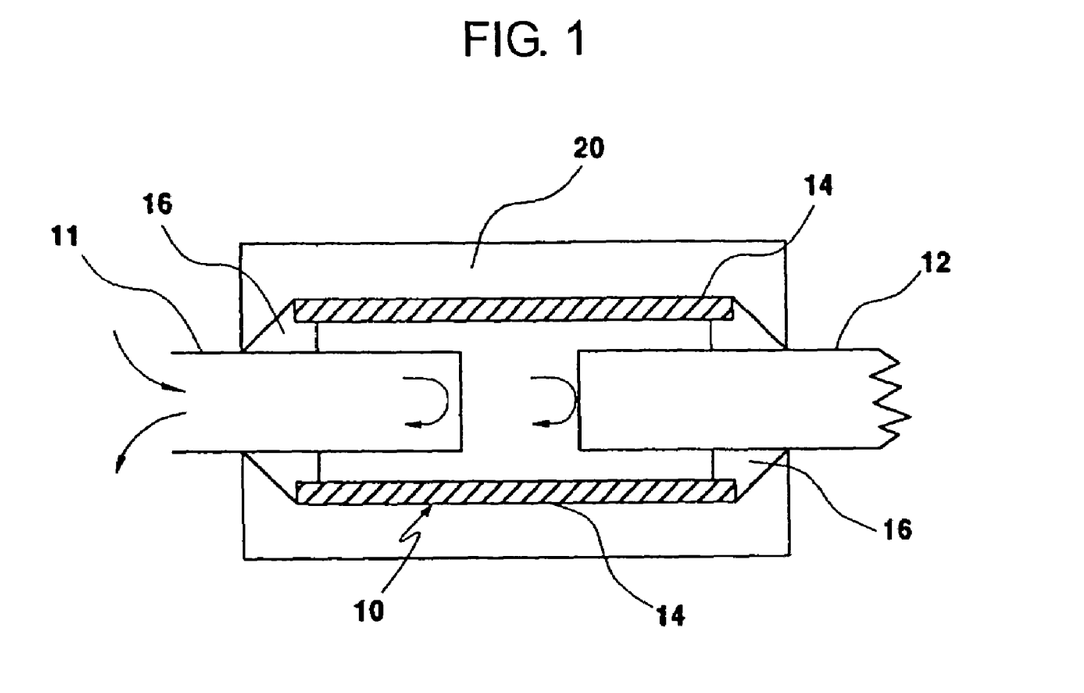
FIG. 1 is a view schematically illustrating a patch-type extrinsic Fabry-Perot interferometric fiber optic sensor according to the present invention.

FIG. 1 is a view schematically illustrating a patch-type extrinsic Fabry-Perot interferometric fiber optic sensor according to the present invention. The patch-type extrinsic Fabry-Perot interferometric fiber optic sensor 10 according to the present invention is provided through attachment of a direction-detecting sensor 20 to the existing extrinsic Fabry-Perot interferometric fiber optic sensor 10.

Specifically, the existing extrinsic Fabry-Perot interferometric fiber optic sensor 10 includes first and second single-mode optical fibers 11 and 12, inserted into both sides of a capillary quartz glass tube 14 and fixed to both end parts of the capillary quartz glass tube 14, for forming an air gap between the first and second single-mode optical fibers 11 and 12. The first and second single-mode optical fibers 11 and 12 are attached to the capillary quartz glass tube 14 using epoxy resin 16.

Also, a direction-detecting sensor 20 for detecting direction information of the strain is attached to an outer periphery of the capillary quartz glass tube 14. In this case, any sensor capable of measuring the direction of the strain may be used as the direction-detecting sensor 20, and in the embodiment of the present invention, a piezoelectric material PZT is used as an actuator and a direction-detecting sensor.

By combining the direction-detecting sensor 20 with the fiber optic sensor 10, the structural vibration of the structure can be sensed through a simple signal process using a displacement signal of the fiber optic sensor having a good sensitivity and the obtained direction information of the structure.

Figure 2:
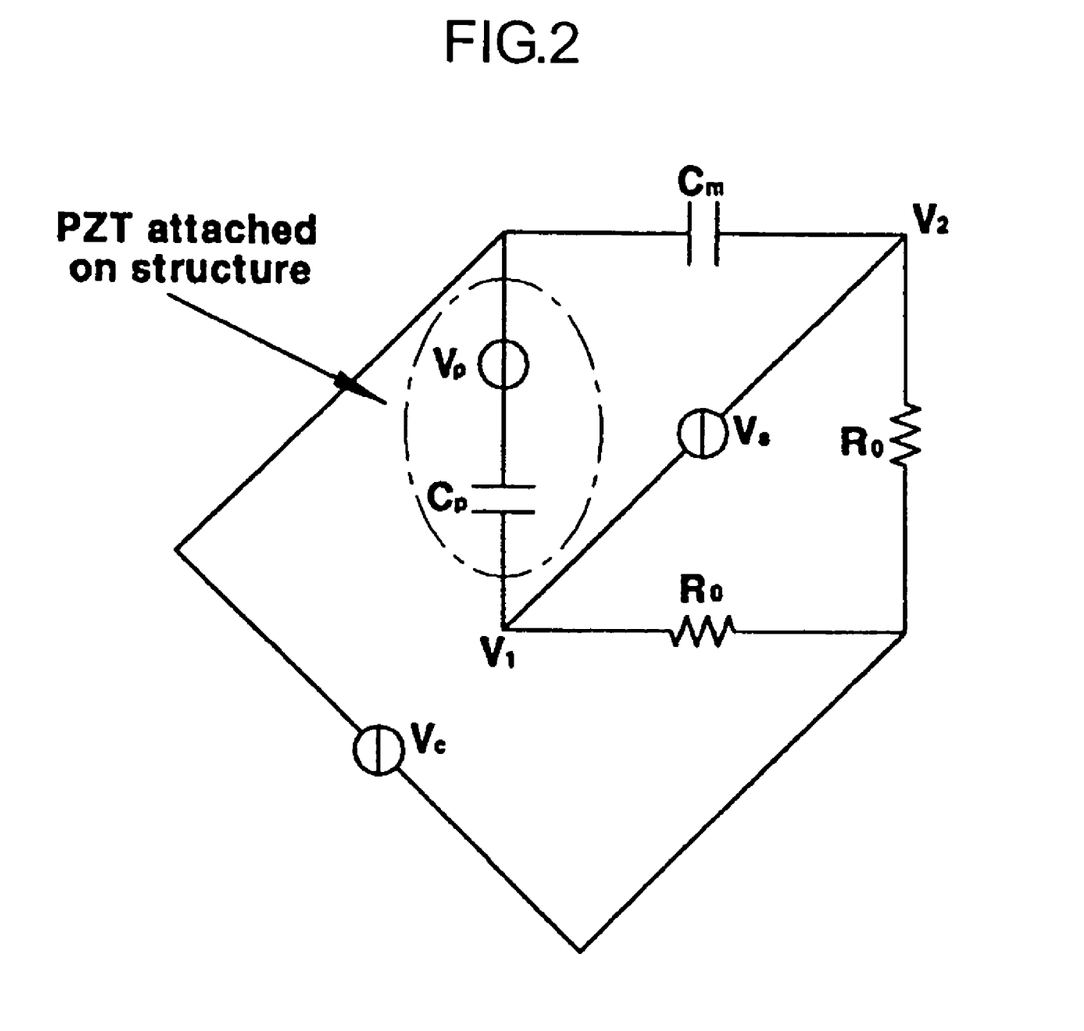
FIG. 2 is a circuit diagram of a self-sensing bridge circuit for extracting only signals caused by a mechanical strain when a control signal is applied to a piezoelectric material according to the present invention.

Also, a bridge circuit can apply an operating force to the structure by applying a control signal to the piezoelectric material 20. FIG. 2 is a circuit diagram of a self-sensing bridge circuit for extracting only charges produced by a mechanical strain of the pure structure except for charges produced from the piezoelectric material, which is used as both the actuator and the direction-detecting sensor, according to the control signal.

Generally, the piezoelectric material 20 has two characteristics, that is, a direct effect and an indirect effect. The direct effect is to produce charges by the mechanical strain, and the indirect effect is that the piezoelectric material makes a mechanical strain when an electric signal is applied thereto.

Accordingly, if the piezoelectric material is attached to the structure, charges produced by a high voltage corresponding to the control signal and charges produced by the actual structural strain are compositely presented, and in this case, only the signals produced by the pure structural strain are extracted through the bridge circuit.

In FIG. 2, the reference numeral $V_c$ denotes a voltage applied to the piezoelectric material, i.e., a control signal applied to the actuator, and a part shown in dotted line denotes a piezoelectric material part which is attached to the structure according to the present invention.

The reference numeral $C_m$ denotes a condenser, having the same capacitance as the piezoelectric material attached to the structure (but, in the present invention, we use identical piezoelectric wafer as a reference condenser in order to compensate temperature variation) and $R_0$ denotes a general resistor of a high capacity, which keeps a constant phase difference (i.e., a phase difference of 90° that indicates a strain ratio referring to a differential value of the strain).

In FIG. 2, $V_s$, which corresponds to the electric potential difference between $V_1$ and $V_2$, refers to a signal that indicates the variation amount of the pure mechanical displacement extracted through the self-sensing bridge circuit, and is used as direction information in a phase accumulation technique to be explained later.

In practice, the existing sensoriactuator using the piezoelectric material uses a similar circuit to that as described above, which has limitations when it is used as both the actuator and the sensor due to the non-linear behavior or hysteresis behavior of the piezoelectric material, and the frequency characteristics of the circuit.

In the present invention, since only the sign component (i.e., direction component of the piezoelectric material) of the self-sensed signal and the strain is sensed using an optical fiber, both the sensor performance and the actuator performance are satisfactory.

Figure 3:
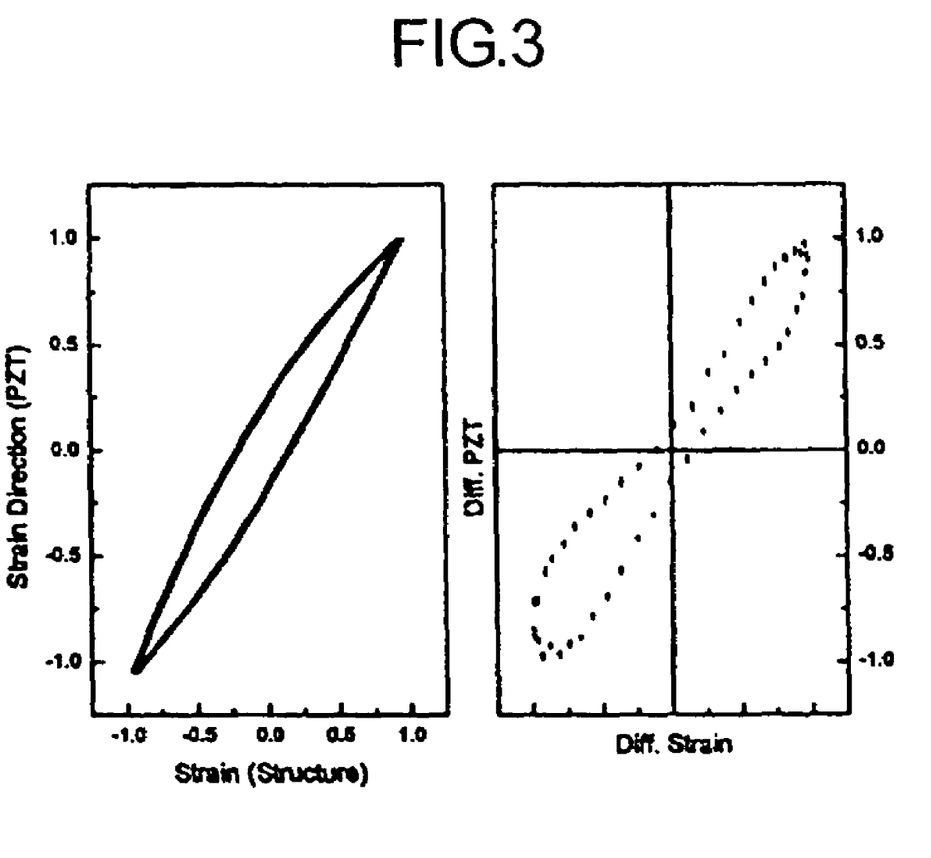
FIG. 3 is a graph showing a hysteresis behavior and a direction variation amount behavior of a piezoelectric material in the case of using the piezoelectric material as a direction-detecting sensor.

FIG. 3 is a graph showing a hysteresis behavior and a direction variation amount behavior of a piezoelectric material in the case of using the piezoelectric material as a direction-detecting sensor. In FIG. 3, it is shown what influence the hysteresis behavior of the piezoelectric material, which gives the direction information, exerts upon the present invention.

In the case of the piezoelectric material, a hysteresis behavior as shown on the left of FIG. 3 appears when the structure vibrates with a sine wave. This means that different amounts of charge are produced with respect to the same amount of strain of the structure. That is, there is a difference between the quantitative values obtained with respect to the same amount of strain of the structure, and this refers to the case that the strain of the structure has not been sensed accurately.

In the present invention, however, only the sign of strain rate information of the piezoelectric material is extracted, and thus the problems of the hysteresis behavior of the piezoelectric material can be solved. For this, it is necessary to verify if the piezoelectric material properly reflects the direction information of the strain of the structure.

As shown on the right of FIG. 3, the piezoelectric material indicates positive direction information if the strain rate is positive, while it indicates negative direction information if the variation amount of the strain rate is negative (i.e., the measured values are distributed in the first and third quarters of the coordinate system), so that the proper sensing of the variation amount of the sign of strain rate.

As described above, according to the present invention, it is confirmed that the hysteresis behavior exerts no influence in obtaining the direction information using the piezoelectric material. Also, the behavior shown on the right of FIG. 3 refers to the result verified through experiments, In the experiments, the same tendency was shown even in a high-frequency domain, and it was verified that the present invention could be adopted in monitoring the structural vibration of a structure in a high-frequency domain.

Figure 4:
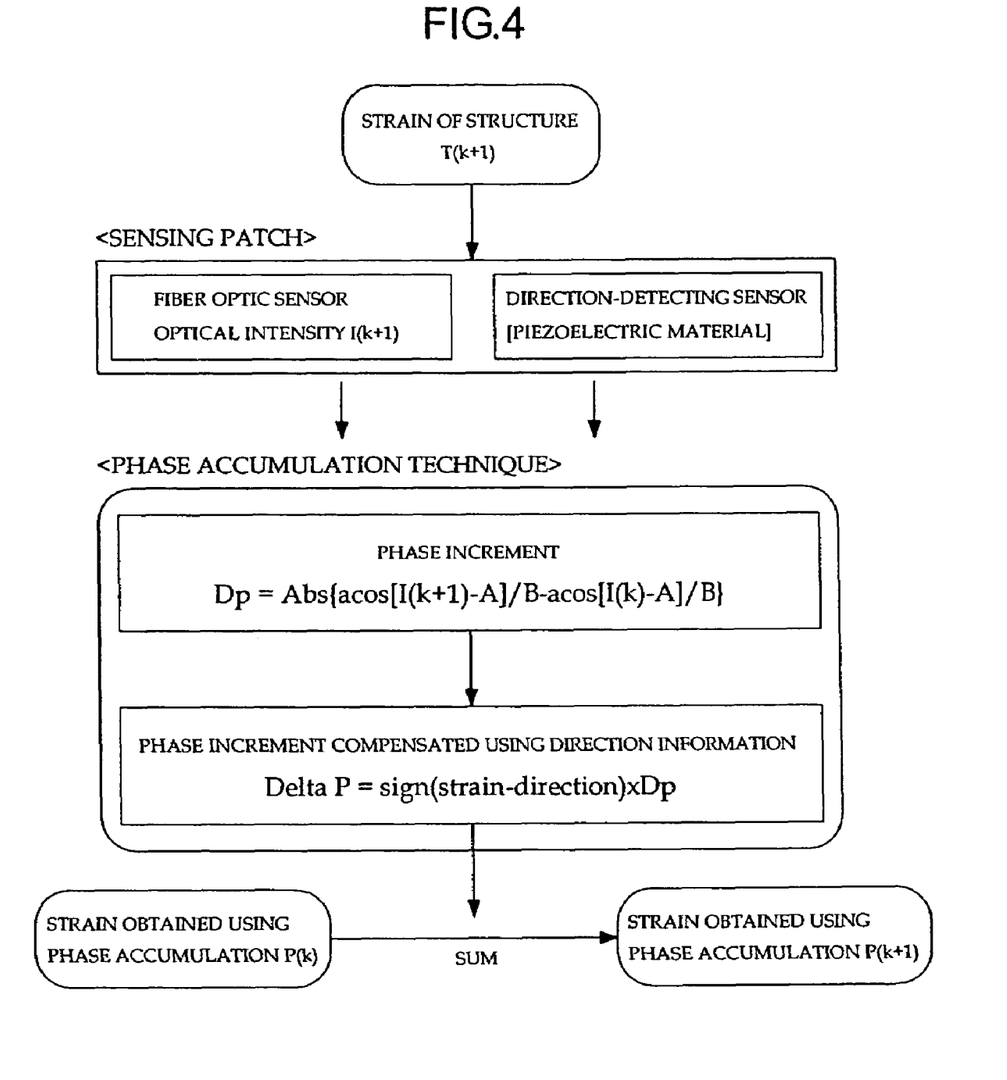
FIG. 4 is a view illustrating a signal process using a fiber optic sensor according to the present invention.

FIG. 4 is a view illustrating a signal process using a patch-type extrinsic Febry-Perot interferometric fiber optic sensor according to the present invention.

As shown in FIG. 4, according to a real-time structural vibration monitoring method using the patch-type extrinsic Fabry-Perot interferometric fiber optic sensor according to the present invention, an optical intensity and direction information of an optical signal are acquired using the patch-type extrinsic Fabry-Perot interferometric fiber optic sensor, and a optical phase increment is obtained using the optical intensity. Then, a compensated phase increment is obtained using the direction information, and a phase accumulation is performed through repetition of obtaining the phase increment for a predetermined number of times. Then, the amount of strain of a structure is monitored using the phase accumulation.

The structural vibration signal of the structure is applied to the self-sensing bridge circuit through a controller, and a high voltage is applied to the piezoelectric material through the self-sensing bridge circuit to control the vibration of the structure.

Specifically, the optical intensity (I) and the direction information are acquired using the fiber optic sensor according to the present invention. The acquired optical intensity (I) and the direction information are expressed as follows. The optical intensity is expressed as $I(t_{k+1})=A+B\cos\{P(t_{k+1})+P_0\}$, wherein A, B and $P_0$ are intrinsic constants of the extrinsic Febry-Perot interferometric fiber optic sensor, which can easily be obtained through the optical intensity. Also, $P(t_{K+1})$ is a variable which indicates the strain of the structure.

The direction information is expressed as
'sign (strain_direction)'.

Then, the phase increment, i.e., the amount of variation (Dp), is calculated from the following equation (1) using the acquired optical intensity (I).

$$Dp = Abs\left[\text{acos}\left(\frac{I(k+1)-A}{B}\right) - \text{acos}\left(\frac{I(k)-A}{B}\right)\right] \qquad (1)$$

Then, the compensated phase increment is obtained from the following equation (2) using the direction information.

$$\Delta P = \text{sign}(\text{strain\_direction}) \times Dp \qquad (2)$$

Using the phase accumulation technique through the equations (1) and (2), the variation amount (P(k+1)) of the structure is obtained.

The error produced due to the accumulation can be removed using a high-pass filter.

Hereinafter, the effects of the present invention will be explained with reference to the experimental results.

Figure 5:
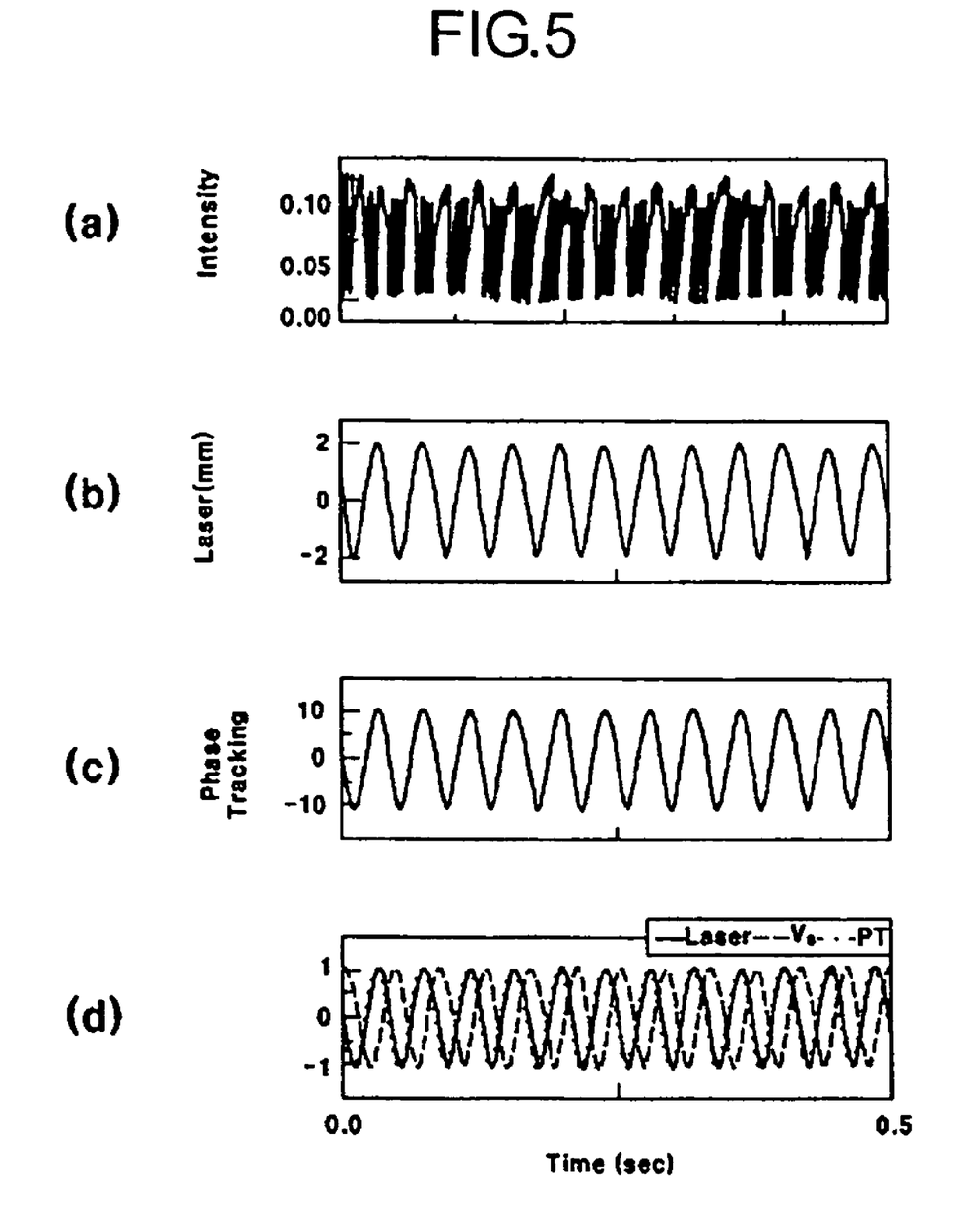
FIG. 5 shows graphs representing vibration signals of a structure as an optical signal(a), a laser signal(b), a signal(c) obtained through the present invention, and a signal(d) outputted from the circuit refers to the actual strain of the structure in the case that no control force is applied to a piezoelectric material.

FIG. 5 shows graphs representing vibration signals of a structure as an optical signal (a), a laser signal (b), a signal (c) obtained through the present invention, and a signal (d) outputted from the circuit refers to the actual strain of the structure in the case that no control force is applied to a piezoelectric material.

In this case, the piezoelectric material is not used as the actuator, and the circuit characteristic of the self-sensing bridge circuit and the signal processing technique can be verified through the graphs.

Generally, since the laser signal enables an accurate real-time measurement of the strain of the structure and thus is mainly used to obtain a vibration signal, the present invention adopts the laser signal for the purpose of detecting the structural vibration of the structure.

Specifically, in FIG. 5, (a) to (d) respectively shows the experimental results in the case that the structure vibrates with a sine wave. The (a) illustrates an optical intensity signal of the fiber optic sensor, the (b) illustrates a laser signal, and the (c) illustrates the result obtained through the real-time signal process according to the present invention.

In FIG. 5, the (d) illustrates the laser signal and the phase of a signal obtained through the self-sensing and phase accumulation technique. In the (d), the signal outputted from the circuit refers to the actual strain of the structure, and it can be confirmed that the signal has a phase difference of 90° from the strain rate information of the structure.

As can be seen from the results, it can be confirmed that by performing a real-time signal process using the distorted optical signal, the structural vibration of the structure can be confirmed.

Figure 6:
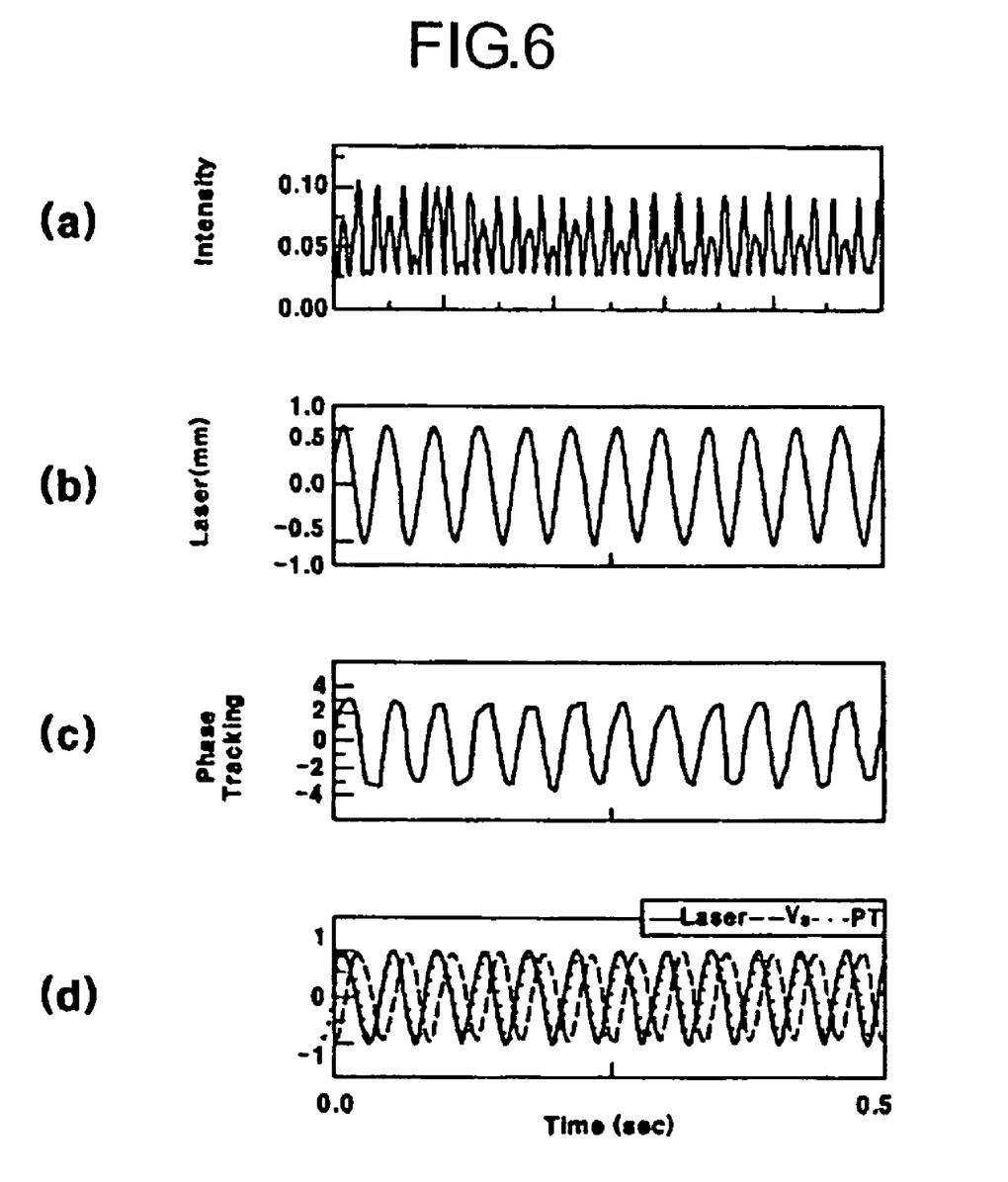
FIG. 6 shows graphs representing vibration signals of a structure as an optical signal(a), a laser signal(b), a signal(c) obtained through the present invention, and a signal(d) outputted from the circuit refers to the actual strain of the structure in the case that a control force is applied to a piezoelectric material.

FIG. 6 shows graphs representing vibration signals of a structure as an optical intensity signal (a), a laser signal (b), a signal (c) obtained through the present invention, and a signal (d) outputted from the circuit refers to the actual strain of the structure in the case that the piezoelectric material is used as both the actuator and the sensor. In this case, a sine wave is applied to the structure as an external force, and the vibration is suppressed by operating a controller so that a control force which is based on the signal obtained through the present invention is applied to the piezoelectric material.

As shown in (a) to (d) of FIG. 6, it can be confirmed that in the case that the control force is applied to the piezoelectric material, the direction information of the structure is acquired through the self-sensing bridge circuit, and the structural vibration of the structure is simultaneously monitored through the phase accumulation technique.

Figure 7:
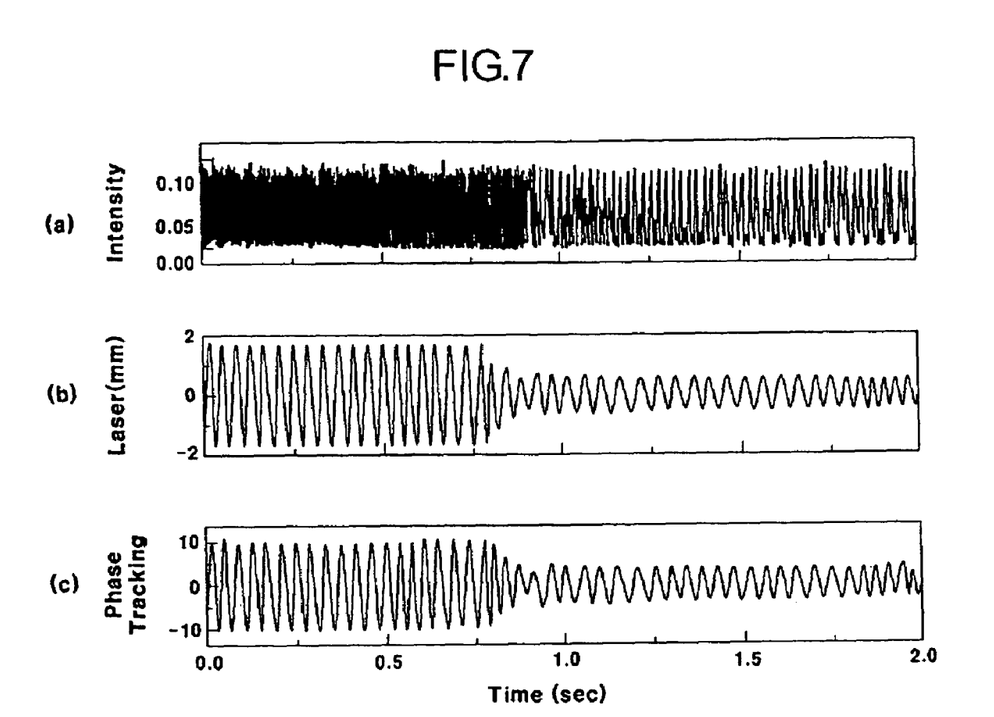
FIG. 7 shows graphs representing the results of simultaneously sensing and controlling vibration using a sensori-actuator, in which (a) illustrates an optical signal of the fiber optic sensor, (b) illustrates a laser signal, and (c) illustrates the result obtained through the real-time signal process according to the present invention in the case that a structure vibration suppresses with an external sine wave excitation.

FIG. 7 shows graphs representing the results of simultaneously sensing and controlling vibration using a sensoriactuator in the case that a structure vibrates with a sine wave. FIG. 7 shows the whole process of sensing the vibration of the structure, which vibrates with a sine wave, using the optical fiber and the piezoelectric material and suppressing the vibration of the structure by operating the controller and using the piezoelectric material as the actuator, which includes the results of FIGS. 5 and 6.

As shown in FIG. 7, (a) illustrates an optical intensity signal of the fiber optic sensor, (b) illustrates a laser signal, and (c) illustrates the result obtained through the real-time signal process according to the present invention. As shown in (a) to (c) of FIG. 7, the controller operates near 0.8 second, and it can be confirmed that the vibration of the structure is reduced.

Figure 8:
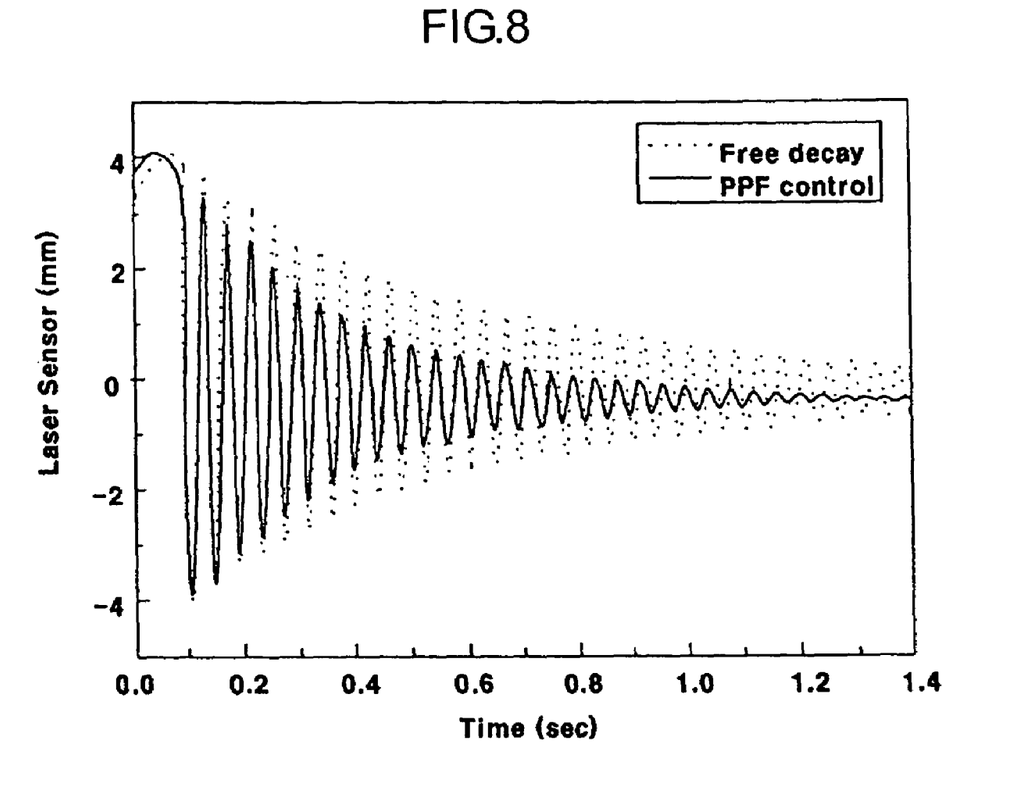
FIG. 8 is a graph representing the result of comparing the case that a residual vibration is suppressed using a sensori-actuator with the case that the residual vibration is not suppressed after a pulse signal is applied to the structure.

FIG. 8 is a graph representing the result of comparing the case that a residual vibration is suppressed with the case that the residual vibration is not suppressed when a vibration in the form of a pulse is applied to the structure using a sensoriactuator. In FIG. 8, a solid line indicates the case that the control is performed based on signal obtained through the present invention, and a dotted line indicates the case that the control is not performed. As can be seen from the results, it can be confirmed that by performing the role of an actuator simultaneously with monitoring the vibration characteristic of the structure using one sensoriactuator, the residual vibration can be promptly suppressed. Since the residual vibration produced during a precise position control can be efficiently suppressed by applying the sensoriactuator to an MEMS system, a prompt position control can be achieved.

As a result, by inserting/attaching a sensoriactuator using an optical fiber and a piezoelectric material into/to the structure, the vibration characteristic of the structure can be monitored and the vibration can be suppressed using an actuator.

As described above, according to the present invention, since only the direction information is acquired with respect to the hysteresis behavior of the direction-detecting sensor, a new sensor can be obtained which has a high sensitivity and a low cost, which are the advantages of the fiber optic sensor, and overcomes the signal distortion phenomenon of the fiber optic sensor and the hysteresis behavior of the direction-detecting sensor. Also, through a simple signal process using the extrinsic Febry-Perot interferometric fiber optic sensor and the direction information, the strain signal according to the structural vibration of the structure can be acquired in real time. Accordingly, by applying the present invention to airplanes, space structures or civil engineering structures such as bridges, an economical and sound monitoring system can be constructed, or the sensing and control of structural vibrations of the structures can be achieved. Also, the present invention can be applied to MEMS systems in replacement of the existing expensive sensor.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A patch-type extrinsic Fabry-Perot interferometric fiber optic sensor, comprising:
    first and second single-mode optical fibers, inserted into both sides of a capillary quartz glass tube and fixed to both end parts of the capillary quartz glass tube, for forming an air gap between the first and second single-mode optical fibers; and
    a direction-detecting sensor fixed to an outer periphery of the capillary quartz glass tube.

2. The sensor as claimed in claim 1, wherein the direction-detecting sensor is a piezoelectric material.

3. The sensor as claimed in claim 2, wherein the piezoelectric material is used as both an actuator and a direction detector.

4. The sensor as claimed in claim 2, wherein the piezoelectric material includes a self-sensing bridge circuit for extracting only a pure mechanical strain ratio when a control force is applied.

5. The sensor as claimed in claim 4, wherein the self-sensing bridge circuit forms a closed circuit network in which a piezoelectric material unit composed of $V_P$ and $C_P$, a condenser $C_m$ having the same capacitance as the piezoelectric material unit and general high-capacity resistors $R_0$ are connected in order;
  wherein a voltage $V_c$ for a control signal is applied between a connection point of the piezoelectric material unit and the condenser and a connection point of the resistors; and
  wherein a voltage measuring unit $V_s$ are connected between a connection point ($V_1$ point) of the piezoelectric material unit and one of the resistors and a connection point ($V_2$ point) of the condenser and the other of the resistors to extract an electric potential difference between the connection points ($V_1$ and $V_2$ points).

6. A real-time structural vibration monitoring method using a patch-type extrinsic Fabry-Perot interferometric fiber optic sensor, comprising the steps of:
  (a) acquiring an optical intensity and direction information using the patch-type extrinsic Fabry-Perot interferometric fiber optic sensor;
  (b) obtaining a phase increment using the optical intensity;
  (c) obtaining a compensated phase increment using the direction information;
  (d) performing a phase accumulation by repeating the step (c) for a predetermined number of times; and
  (e) obtaining an amount of strain of a structure using the phase accumulation at the step (d).

7. The method as claimed in claim 6, wherein at step (b), the phase increment (Dp) is obtained by a following equation $$Dp = Abs\left[\operatorname{acos}\left(\frac{I(k+1)-A}{B}\right) - \operatorname{acos}\left(\frac{I(k)-A}{B}\right)\right]$$

wherein the optical intensity is expressed as $I(t_{k+1})=A+B\cos\{P(t_{k+1})+P_0\}$, A, B and $P_0$ are intrinsic constants of the extrinsic Febry-Perot interferometric fiber optic sensor, which can easily be obtained through the optical intensity, and $P(t_{K+1})$ is a variable which indicates the strain of the structure.

8. The method as claimed in claim 6, wherein the compensated phase increment ($\Delta P$) at step (c) is obtained by a following equation $$\Delta P = \operatorname{sign}(\text{strain\_direction}) \times Dp.$$

9. The method as claimed in claim 6, further comprising the step of removing an error produced due to the accumulation after step (d) using a band-pass filter.

* * * * *